United States Patent [19]
Burns

[11] 3,919,159
[45] Nov. 11, 1975

[54] THERMOPLASTIC VINYL TILE PRODUCTS AND PRODUCTION THEREOF
[75] Inventor: Robert A. Burns, Long Valley, N.J.
[73] Assignee: Engelhard Minerals & Chemicals Corporation, Edison, N.J.
[22] Filed: Oct. 4, 1974
[21] Appl. No.: 512,099

Related U.S. Application Data
[63] Continuation-in-part of Ser. No. 424,337, Dec. 10, 1973, abandoned.

[52] U.S. Cl.... 260/31.2 R; 260/31.4 EP; 260/42.49
[51] Int. Cl.².... C08K 3/26; C08K 3/34; C08K 7/00
[58] Field of Search...... 260/42.49, 31.2 R, 31.4 EP

[56] References Cited
UNITED STATES PATENTS
3,463,765  8/1969  Cote et al............. 260/42.49 X
3,641,206  2/1972  Weitzel et al.......... 260/42.49 X OTHER PUBLICATIONS
Sarvetnick, *Polyvinyl Chloride* (van Nostrand Reinhold, 1969), pp. 75, 81–82, 107–110, 145, 151, 219 244.
Penn, *PVC Technology* (Wiley Interscience 3 ed. 1971), pp. 147–148, 188–190.

*Primary Examiner*—Melvin Goldstein
*Assistant Examiner*—T. De Benedictis, Sr.
*Attorney, Agent, or Firm*—Melvin C. Flint; Inez L. Moselle

[57] ABSTRACT

A combination of calcined attapulgite and platy talc is used as a reinforcing filler along with a calcium carbonate bulking agent in rigid, hard and durable asbestos-free thermoplastic vinyl tiles. The tiles are produced by the conventional hot calendering technique.

10 Claims, No Drawings

THERMOPLASTIC VINYL TILE PRODUCTS AND PRODUCTION THEREOF

RELATED APPLICATIONS

This application is a continuation-in-part of my copending application, Ser. No. 424,337, filed Dec. 10, 1973 and now abandoned.

BACKGROUND OF THE INVENTION

1. Field of the Invention

The invention relates to mineral-filled rigid vinyl chloride tiles of the type used for floor covering and particularly to asbestos-free reinforced vinyl tiles.

The principal object of the invention is to provide asbestos-free mineral reinforced tiles which possess a spectrum of properties heretofore obtainable only when using asbestos fibers as a reinforcing agent. Another object is to produce the asbestos-free tiles by subjecting a mixture of vinyl polymer, plasticizer, stabilizer and carefully selected combination of mineral fillers to the conventional hot calendering processing.

2. Prior Art

Rigid inexpensive vinyl tiles of the type used as floor coverings are invariably formulated with a fibrous asbestos filler. For this reason they are usually referred to as "vinyl asbestos tiles." The asbestos is used as a reinforcement in the finished tile and it also serves the vital role of providing hot strength to the mixture of polymer, plasticizer and filler during hot calendering. Invariably calcium carbonate is used as a bulking agent. Typical formulations contain about 20% of a vinyl chloride-vinyl acetate copolymer and about 80% asbestos and mineral filler. Plasticizers and resins are often added to improve filler wetting and ease of calendering. Typical formulations for producing such tiles are described in U.S. Pat. No. 2,773,851 to Leo L. Tolman. These flooring tiles differ from the flexible resilient floor coverings available as sheet or tile which contain smaller amounts of various filler such as clays, carbonates or, in some cases, small amounts of asbestos.

The Government has recently imposed limitations as to the amount of air-borne asbestos which is permitted in a plant because of the potential health hazards associated with asbestos. One method for eliminating airborne asbestos is to eliminate the need for asbestos in products such as vinyl floor tiles. Fibrous fillers, notably the fibrous variety of talc and wood flour, are disclosed in the literature as being possible alternatives to the use of asbestos in rigid vinyl tiles. It is generally accepted, however, that asbestos is vastly superior to such fibrous fillers and to the best of my knowledge all of the reinforced vinyl tile which is marketed at this time is of the vinyl asbestos type.

SUMMARY OF THE INVENTION

The essence of the invention resides in the provision of hard, rigid, durable asbestos-free vinyl tile by utilizing as the filler the combination of heat-activated attapulgite clay, platy talc and the conventional calcium carbonate bulking agent, the combination of fillers constituting the major constituent, on a weight basis, of the vinyl tile composition. Optionally, a kaolin clay filler may be substituted for a portion of the talc.

An aspect of the invention involves the production of mineral-reinforced asbestos tiles by hot calendering a suitable plasticized vinyl chloride polymer and a mixture of heat-activated attapulgite clay, platy talc and, optionally, kaolin clay. The attapulgite clay functions during hot calendering to impart sufficient hot strength to the other ingredients to avoid tearing.

From this brief description of the invention it is apparent that an essential feature of the invention resides in the use of a three-component mineral filler for vinyl tiles. Calcined attapulgite is unsuitable as the sole filler. This type of clay has unusually high oil absorptivity. When used alone, the heat-activated clay would absorb an excessive amount of plasticizer, making processing difficult or impossible. Similarly, kaolin clay and talc are highly oil absorptive. When platy talc and/or kaolin clay are used with calcined attapulgite in the absence of calcium carbonate, calendering and handling will be difficult and the tiles will have low impact and flexural strength. A mixture of calcined attapulgite clay and calcium carbonate without platy talc results in tiles which are stiff and have poor impact strength. On the other hand, tile compositions prepared without heat-activated attapulgite clay, using various combinations of other conventional mineral fillers including combinations of kaolin clay (calcined and uncalcined) and calcium carbonate, lack the ability to maintain strength at elevated temperature and the tiles do not possess the requisite combination of properties. Tiles prepared in accordance with this invention with a combination of calcined attapulgite clay, calcium carbonate and talc display increased strength at room temperature and maintain their strength at elevated temperature.

DETAILED DESCRIPTION

Vinyl chloride polymers useful in practice of the invention include simple homopolymers of vinyl chloride or copolymers, terpolymers or the like which possess the essential properties of the polymeric structure of polyvinyl chloride. Such copolymers and terpolymers contain at least 70% vinyl chloride. Examples are given in U.S. Pat. No. 3,379,674 to John H. Jakob and reference is hereby made thereto. Especially preferred are copolymers of vinyl chloride, especially copolymers of vinyl chloride and vinyl acetate containing at least 70% vinyl chloride, e.g., copolymers of 85% to 87% vinyl chloride and 13% to 15% vinyl acetate.

Representative plasticizers are enumerated in U.S. Pat. No. 3,379,674 and the plasticizers listed therein may be employed in practicing the invention. The most widely used plasticizer for preparing thermoplastic vinyl chloride compositions is a mixture of dioctyl phthalate and epoxidized soya bean oil used in proportions of approximately 1 part by weight soya bean oil to 4 to 6 parts by weight dioctyl phthalate. Combinations of soya bean oil with other plasticizers of the aromatic type, e.g., butyl benzyl phthalate, are also useful. The list of stabilizers in U.S. Pat. No. 3,379,674 is also incorporated herein by reference.

Normally a lubricant, usually stearic acid, is included in the formulation to minimize adherence of the plasticized vinyl composition to the calender rolls. Alternatively a lubricant, e.g., a silicone oil, can be applied to the calendered rolls.

The attapulgite clay employed in practicing the present invention must be a heat-activated grade in powder form. Such clay material is obtained by calcining naturally-occurring extruded or unextruded attapulgite clay (Georgia-Florida fullers earth) at a temperature in the range of about 900° to 1200°F. to a volatile matter (V.M.) below 10%, preferably 5% or less. The V.M. or volatile matter of the raw earth as mined is usually about 50%, V.M. being the loss of weight, expressed on a percentage basis, of the earth when heated to essentially constant weight at about 1800°F. The heat treatment used to prepare clay suitable for use in the invention is conventionally termed "activation" and is described in an article entitled "Thermal Activation of Attapulgus Clay," W. S. S. McCarter et al., INDUSTRIAL & ENGINEERING CHEMISTRY, Vol. 42, page 529 (March 1952). Activation of attapulgite clay by calcining it to a V.M. below about 10% destroys the natural properties of the clay and it increases the sorptivity. The activated clay in powdered form may be obtained by calcining extruded pellets of the starting clay, crushing and grinding the calcined pellets and recovering a fraction of desired size. Recommended are commercially available products supplied under the trademarks ATTASORB LVM and ATTACLAY. The former product has an average particle size of 2.9 microns, equivalent spherical diameter, and is 95% by weight finer than 10 microns. The latter product has an average particle size of 1.8 microns and is 28% finer than 10 microns; plus 325 mesh content is 15% by weight.

Platy talc useful in practice of the invention has an average particle size in the range of 3 to 15 microns and is essentially free from particles larger than 325 mesh. Surface area (B.E.T.) is generally in the range of 6 to 15 m²/g.

Platy kaolin clay is optionally substituted for a portion of the platy talc. Recommended is a high purity uncalcined (hydrated) clay which is at least 75% by weight finer than 2 microns. Surface area of such grades of kaolin clay is typically in the range of 2 to 10 m²/g.

The calcium carbonate may be any grade of powdered limestone of the type conventionally used as a filler in reinforced vinyl tile. Generally, suitable calcium carbonate fillers have average particle sizes in the range of 2 to 20 microns and are predominantly finer than 325 mesh (Tyler).

In practicing my invention, conventional relative proportions of plasticizer may be employed and the usual criteria may be employed in selecting these proportions. Generally, the plasticizer is used in amount within the range of about 30% to 60% of the weight of the vinyl chloride polymer, with about 50% being most common in the case of the preferred vinyl chloride–vinyl acetate copolymer plasticized with a mixture of dioctyl phthalate and epoxidized soya bean oil. The soya bean oil is used in minor amount relative to the dioctyl phthalate.

The amount of plasticized vinyl chloride polymer is generally in the range of 15% to 45% of the weight of the total ingredients of the tile compositions. Most usual is the use of plasticized vinyl chloride in amount in the range of 20% to 30%, especially about 24% to 26%, of the weight of the composition.

A general guide for selecting the quantities of fillers to be added is based upon maintaining an equal (a) filler volume, and (b) total theoretical amount of oil absorbed by the fillers as compared with a standard formulation containing asbestos filler and calcium carbonate bulking agent. The theoretical oil absorption for the mixture can be calculated from literature values for oil absorption determined by the Spatula Rub-Out Method (ASTM D281-31) and assuming that the volumes of oil absorbed by the individual fillers is additive.

The combined amount of mineral fillers is in the range of about 65% to 85% of the tile compositions, usually about 70% to 76%, and will depend upon the type and amount of plasticizer used as well as the relative proportions of heat-activated clay, calcium carbonate, and talc or mixture of talc and platy kaolin clay. Sufficient filler ingredients must be used to provide a mix having a consistency amenable to hot calendering. The relative proportions of minerals must be carefully selected to provide desired strength during calendering as well as after calendering. Sufficient heat-activated attapulgite clay must be present to impart adequate hot strength and reinforcement to the finished tile composition. Generally, attapulgite constitutes about 2% to 15% by weight of the tile composition. In the case of a preferred tile composition containing about 70% to 75% total filler, the attapulgite constitutes about 4% to 10% of the total weight of the tile composition. Sufficient calcium carbonate is used to provide sufficient bulk to the ingredients so that the sheets can be calendered and handled. Invariably the calcium carbonate constitutes the predominating (over 50% by weight) constituent of the mineral filler mixture. In the case of the especially preferred compositions containing about 24% to 26% plasticized copolymer, a typical amount of calcium carbonate is in the range of about 35% to 45% of the weight of the total tile composition.

The relatively low surface area platy filler talc (or combination of talc and uncalcined kaolin clay) is used in amount which will impart, in combination with the other mineral filler, the desired flexibility and impact strength. Usually members of this class of minerals are used in an amount which exceeds the amounts of attapulgite clay but is less than the amount of calcium carbonate. Typically, platy talc is used in amount within the range of 15% to 35% by weight of the total composition. Up to about half of the platy talc (weight basis) may be replaced with kaolin clay without appreciable change in tile properties. Kaolin clay is desirable when tiles having high brightness are sought. Replacement of all of the platy talc with an equivalent amount of platy kaolin clay will result in loss in hardness and flexural strength.

Typical formulations are as follows:

| | Parts by Weight |
|---|---|
| Vinyl copolymer | 15–20 |
| Plasticizer(s) | 5–10 |
| Calcined attapulgite clay | 2–15 |
| Calcium carbonate | 30–50 |
| Platy talc (or mixtures of platy talc with up to 50% by weight of platy kaolin clay) | 15–35 |
| Stabilizer(s) | as needed |
| Pigment, e.g., TiO₂ | as needed |
| | 100.0 |

Especially recommended is a formulation of the following ingredients:

| | Parts by Weight |
|---|---|
| Vinyl copolymer (vinyl chloride–vinyl acetate) | 14–18 |
| Plasticizer(s) | 6–8 |
| Calcined attapulgite clay | 4–10 |
| Platy talc | 25–30 |
| Calcium carbonate | 35–40 |
| Pigment, e.g., TiO₂ | 0–5.4 |
| Stabilizers | as needed |

-continued

| | Parts by Weight |
|---|---|
| | 100.0 |

EXAMPLE I

In an illustrative example of the invention, tiles having processing characteristics and properties (including hardness, flexural and impact strength) at least as good as those of current vinyl asbestos tiles were prepared from the following formulation.

| Material | Weight Percent |
|---|---|
| Vinyl copolymer (85% vinyl chloride-15% vinyl acetate) | 17.7 |
| Dioctyl phthalate | 6.2 |
| Epoxidized soybean oil | 1.1 |
| Nuostabe V1324 (stabilizer) | 1.1 |
| Stearic acid | 0.2 |
| TiO₂ pigment | 1.8 |
| Chemcarb 66, * | 40.0 |
| Emtal 500, ** | 27.5 |
| Attaclay LVM *** | 4.4 |

* ground limestone
** platy talc
*** heat activated (calcined) attapulgite clay

The resin, plasticizers and stabilizer were mixed together prior to addition of fillers. A two-roll mill with differential speed rolls of 20 and 25 r.p.m. was used for compounding. The roll temperatures were adjusted to 200°F. (fast roll) and 300°F. (slow roll) by steam heating.

Approximately 600 grams of compound with ingredients spatula mixed was placed into the "nip" of the rolls. The compound was picked up by the fast roll and removed immediately with a take-off blade. Once the compound had completely passed through the mill, it was returned to the mill. This procedure was repeated for a period of 4 minutes.

The final sheet, approximately ⅛-inch thickness, was prepared by opening the roll gap. The compound was passed through the mill and immediately removed with the take-off blade.

EXAMPLE II

The following tests were carried out to demonstrate that asbestos-free vinyl tiles comparable in properties to vinyl asbestos tiles may be obtained by substituting for the asbestos the combination of specific calcined clay, namely calcined attapulgite clay and talc. The results of the tests show also that tiles comparable to the vinyl asbestos tiles were not obtained when a variety of other filler systems were substituted for the asbestos.

The formulation for the asbestos reinforced tiles, understood to be typical of commercial formulations, was as follows:

| | Parts (wt.) |
|---|---|
| PVC/PVA copolymer (85% vinyl chloride-15% vinyl acetate) | 100 |
| Dioctyl phthalate | 35 |
| Epoxidized soybean oil | 6 |
| Stabilizer | 6 |
| Stearic acid | 1 |
| TiO₂ pigment | 10 |
| Asbestos 7R-3) | 150 |
| Filler | |

-continued

| | Parts (wt.) |
|---|---|
| Chemcarb 66 ) | 250 |

Experimental formulations were produced using the same ingredients with the exception that various other filler materials were substituted for the asbestos. In all formulations calcium carbonate ("Chemcarb" 66) was used as a bulking agent. The total quantity of fillers in all of the experimental formulations was selected to maintain the same filler volume used in preparing the conventional (control) tiles and the total theoretical amount of oil absorbed was the same in all formulations.

Fillers used in some of the experimental formulations are identified as follows:

Attaclay LVM — calcined attapulgite clay
Satintone No. 2 — calcined kaolin clay
Emtal 500 — platy talc
ASP 102 — uncalcined platy kaolin clay Details of the method for preparing the tiles are given in Example I.

During processing of reinforced vinyl tiles it is imperative that the formulation maintain its strength at high temperature (e.g., 300°F.) to prevent the calendered sheet from pulling apart. One of the functions of an asbestos filler is to provide hot strength. To evaluate hot strength the following test was used. A ⅛-inch hole was drilled into each tile specimen which was then suspended on a hook in a Despatch oven at 300°F. for 2 hours. The hole distortion during oven aging serves to provide an indication of hot strength. Acceptable hot strength was characterized by the substantial absence of sag and deformation.

The following tests were carried out to compare the properties of the control (conventional) and experimental reinforced vinyl tiles. All specimens were equilibrated at 74°F. and 48% relative humidity for at least 24 hours before testing.

Hardness was evaluated by the well-known Shore "D" test. Impact strength was measured by the Izod method and also by the falling ball impact method (Fed. Method No. 3311). In the modified Federal test method, a 1-inch diameter steel ball weighing 0.143 pounds is dropped from a height of 20 inches (for ⅛ inch thickness tiles). Failure occurs when cracks are observed after four or less ball impacts. Since all tiles passed this test, the height was changed to 30 inches to permit discrimination between samples. The number of drops (up to a maximum of 6) that were required to induce failures were recorded for the 30 inch height. In measuring flexural properties, six specimens (three parallel and three perpendicular to the grain), each 1 × 4.5 inches, were tested.

In accordance with Federal Test Method No. 3131, the deflection of each specimen was determined using the Instron Tester with crosshead speed of 2 inches per minute and span length of 4 inches. This test measures the distance that the specimen has deflected (or bent) at the moment it breaks up or slips through the supports. Average values are reported. Since it is believed that this test has inherent deficiencies, the flexural strength for each specimen was also determined. The reported values are the average of six specimens and are given in pounds per square inch (p.s.i.).

The results, summarized in table form, show that only the conventional tile formulation "A" (asbestos-carbonate filler) and the experimental formulations which contained calcined attapulgite clay (B, C and D) had acceptable hot strength. The other formulations sagged and/or deformed excessively when held at elevated temperature. Of the formulations containing calcined attapulgite clay, only the formulation containing a mixture of the calcined attapulgite clay with platy talc (B) had impact strength and flexural properties comparable to those of the asbestos-filled formulation. Thus, tiles produced with calcined attapulgite clay in the absence of talc (C and D) had low impact strength and, in the case of C, the tiles also had low flexural strength.

The data for test F (calcined kaolin clay filler) show that the tiles were lacking in hardness, impact strength and flexural properties. As mentioned, formulation F also lacked strength at elevated temperature.

5. The tile composition of claim 4 wherein the calcium carbonate is present in amount of about 30 to 50% based on the weight of the tile composition and said platy talc is present in amount of about 15 to 35% by weight of the tile composition.

6. The tile composition of claim 4 wherein said heat-activated attapulgite clay is present in amount in the range of about 4 to 10% based on the weight of the tile composition.

7. The tile composition of claim 2 which contains from 2 to 15% by weight of heat-activated attapulgite clay and from 15 to 35% by weight of a platy filler selected from the group consisting of talc and mixtures of talc with up to 50% by weight of kaolin clay.

8. A reinforced thermoplastic vinyl chloride sheet composition which comprises about 16 to 18% by weight of a vinyl chloride-vinyl acetate copolymer containing at least 70% vinyl chloride, about 6 to 8% by EFFECT OF FILLERS ON PROPERTIES AND PROCESSING CHARACTERISTICS OF VINYL FLOOR TILES
Parts by Weight Filler per 100 PVC/PVA

|  | Conventional Vinyl Tile Formulation | Formulation of Subject Invention | Formulations Outside Subject Invention | | | |
|---|---|---|---|---|---|---|
| Filler | A | B | C | D | E | F |
| Asbestos | 150 | 0 | 0 | 0 | 0 | 0 |
| Calcium carbonate | 250 | 225 | 230 | 290 | 204 | 250 |
| Calcined attapulgite clay | 0 | 25 | 25 | 105 | 0 | 0 |
| Calcined kaolin clay | 0 | 0 | 0 | 0 | 0 | 150 |
| Talc | 0 | 155 | 0 | 0 | 210 | 0 |
| Uncalcined kaolin clay | 0 | 0 | 140 | 0 | 0 | 0 |
| Properties |  |  |  |  |  |  |
| Hardness, Shore "D" | 66 | 68 | 68 | 73 | 66 | 61 |
| Impact strength |  |  |  |  |  |  |
| Izod, ft.-lb./in. | 2.4 | 2.2 | 1.9 | 1.0 | 1.6 | 1.4 |
| Falling ball, lb. drops at 30" | 6 | 6 | 3 | 2 | 6 | 2 |
| Flexural properties |  |  |  |  |  |  |
| Deflection, inches | 1.39 | 1.47 | 1.44 | 1.46 | 1.44 | 1.45 |
| Strength, p.s.i. | 550 | 670 | 440 | 800 | 500 | 415 |
| Hot strength * | A | A | A | A | F | F |

* = A — Acceptable
F — Failure

I claim:

1. A reinforced thermoplastic vinyl chloride tile composition suitable for the manufacture of floor tile which comprises a minor weight proportion of a plasticized vinyl chloride polymer uniformly mixed with a major weight proportion of a mixture of finely divided mineral fillers, said mixture of fillers comprising, based on the total weight of said composition, 2% to 15% attapulgite clay which has been heat activated to a volatile matter content below 10% by weight, 15 to 35% platy talc and 30 to 50% calcium carbonate, with the proviso that the combined amount of mineral fillers is in the range of about 55 to 85% of said total weight, said composition being free from asbestos.

2. The tile composition of claim 1 wherein said plasticized vinyl chloride constitutes about 20 to 30% by weight of the composition, the mixture of fillers consisting essentially of the balance.

3. The tile composition of claim 2 wherein said plasticized vinyl chloride constitutes about 24 to 26% of the weight of said composition and is a vinyl chloride-vinyl acetate copolymer containing at least 70% vinyl chloride.

4. The tile composition of claim 3 wherein said heat-activated attapulgite clay has an average particle size in the range of 3 to 20 microns and is present in amount in the range of about 2 to 15% based on the weight of the tile composition.

weight of a plasticizer composed of a combination of dioctyl phthalate and epoxidized soya bean oil, stabilizer, pigment and, as a filler, from 4 to 10% by weight of attapulgite clay heat-activated to a volatile matter below 5% by weight and in the form of a powder having an average particle size below 20 microns, 35 to 40% by weight calcium carbonate and 25 to 30% by weight of a platy talc, said composition being essentially free from asbestos.

9. In a method for producing reinforced thermoplastic vinyl chloride wherein a plasticized vinyl chloride polymer is mixed with mineral fillers including a filler which functions as a reinforcing agent and provides hot strength and a filler which functions as a bulking agent, and the resulting tile composition is calendered between heated rolls to form sheets, the improvement whereby the desired hot strength and reinforcement are obtained without incorporating asbestos, which comprises utilizing as the filler a mixture of minerals consisting essentially of micron-size particles of attapulgite clay which has been heat activated to a volatile matter below 10% by weight, 15 to 35% platy talc and 30 to 50% calcium carbonate, said particles of attapulgite clay being present in amount within the range of about 2 to 15% based on the weight of the tile composition, with the proviso that the combined amount of mineral fillers is in the range of about 55 to 85% of the weight of said composition.

10. The method of claim 9 wherein the mixture of mineral fillers constitutes from about 70 to 80% by weight of the filled composition and the attapulgite clay constitutes from about 4 to 10% by weight of the filled composition.

* * * * *